J. North.
Paper Folding Mach.
No. 574. Reissued Jul. 27. 1858.
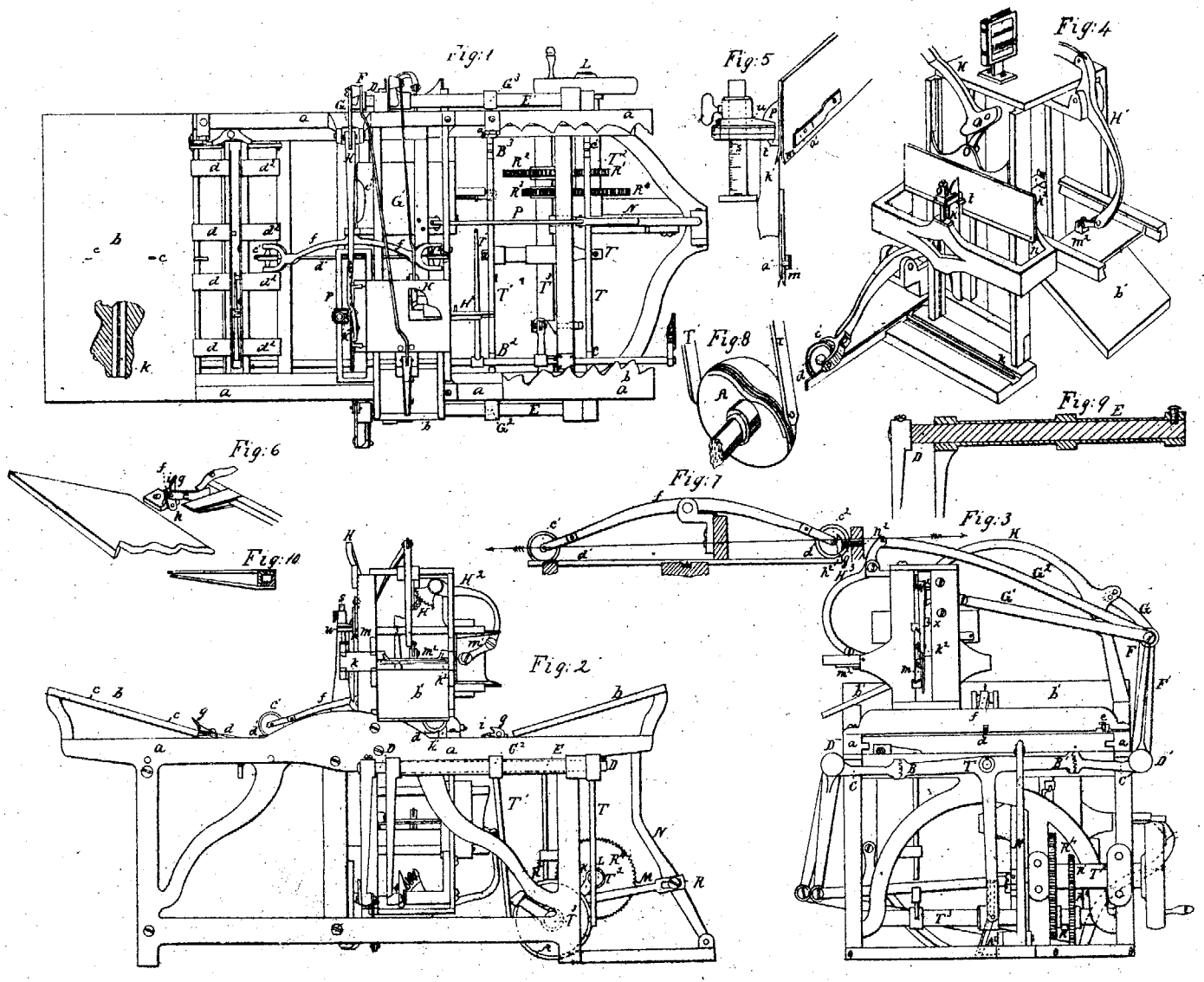

UNITED STATES PATENT OFFICE.

S. T. BACON, OF BOSTON, MASSACHUSETTS, ASSIGNEE OF A. HARDY, ASSIGNEE OF J. NORTH.

MACHINE FOR FOLDING PAPER.

Specification forming part of Letters Patent No. 14,697, dated April 15, 1856; Reissue No. 574, dated July 27, 1858.

*To all whom it may concern:*

Be it known that Letters Patent of the United States for Improvements in Folding-Machines were granted to JOHN NORTH on the 15th day of April, 1856, and by the said NORTH assigned to ANSON HARDY on the 28th day of May, A. D. 1856, by deed recorded in Liber D[4], page 28, of the records of transfers of patents in the United States Patent Office, and by the said ANSON HARDY assigned to me on the 1st day of July, 1856, by deed recorded in Liber D[4], page 29, of transfers of patents in the United States Patent Office; and I do hereby declare that the following is a full, clear, and exact description of the same, reference being had to the accompanying drawings, forming part of this specification.

The nature of the said invention consists, first, in the use of a stationary knife-edge over which the sheet of paper is folded; secondly, in the use of nippers for folding the sheet over the knife-edge and passing it through the machine; thirdly, in so constructing and operating the several nippers that each shall first fold the sheet over a stationary knife-edge, then convey the sheet so folded to the proper position for receiving another fold, hold it there until the next succeeding nipper shall have come into contact with the sheet, and then release it and proceed sufficiently farther to allow the sheet to clear the said nipper and proceed in another fold, as may be required; fourthly, in the peculiar method of releasing the sheet from the nipper; fifthly, in a rotary trip-dog for raising and depressing the fingers which seize the sheet; sixthly, in attaching the stationary knives to the reciprocating carriage; eighthly, in the peculiar manner of hanging the cutting-rollers and operating the same; and, ninthly, in the arrangement of devices for operating the nippers.

To enable those skilled in the art to make and use the said invention I will proceed to describe its construction and operation, referring by letters to the accompanying drawings, which form part of this specification, and where—

Figure 1 represents a plan of the machine. Fig. 2 represents a side elevation. Fig. 3 represents an end view. Fig. 4 represents a detached view showing in perspective the nipper and folding-knife and parts connected therewith. Fig. 5 represents an enlarged view showing the mode of checking and adjusting the motion of folding-nipper. Fig. 6 represents a detached view of the trip-dog and part of a finger-bar. Fig. 7 represents a detached view of the cutting apparatus. Fig. 8 represents a detached view of the cam which gives the motion to the nippers. Fig. 9 represents a section of one pair of the concentric rock-shafts, and Fig. 10 represents a section of the fingers and finger-bar.

Before describing the several features of the invention it may be well to remark the machines which have heretofore been invented for folding paper, that it may be clearly distinguished from them.

The first patent granted in this country for folding machinery was to E. M. Smith, November 27, 1849. In this machine the paper is folded by movable knives or straight-edges pressing it in between pairs of rollers, which latter, having a rotary motion each toward the one adjacent to it, continue to draw the folded sheet in between them and pass it through between tapes to a position at which the sheet is to be again pressed in between another set of rollers by another movable knife-edge and so on. The sheet is folded in between pairs of rollers by movable knife-edges and passed through the machine by the rotations of the former until all the folds are given to the paper.

In another machine, for which Letters Patent were granted to G. K. Snow, October 15, 1850, the paper is folded about on the same principle. In this machine the sheet is folded by being pressed in between two sheets of metal (or other material) or into a thin case, through which it is passed along by the continuous pressing of the knife until the sheet arrives at a proper position to receive another fold, where it is struck into and pressed through another case by another moving knife-edge.

It will now be seen from my description that this machine operates upon a different principle to produce the fold in the sheet, and that the several features of mechanism constituting this invention are consequent to the new principle of folding embodied in it.

The frame-work of the machine—as seen at *a a* in Figs. 1 and 2—is somewhat similar in appearance to the frame-work of a double printing press, and since the machine is double in its operation it will be necessary only to describe one-half.

Similar letters referring to similar parts in the two halves, *b* is the table or fly-board upon which the sheets are laid in order to be introduced to the folding apparatus. This board has register-pins *c c*, which are operated in the usual manner. The sheet is seized on its edge by the fingers *d d*, attached to the reciprocating carriage and withdrawn from the fly-board, and carried by the fingers under the folding-nippers. The fingers *d d* are made to open and close at the proper times by mechanism commonly employed in printing-presses to effect the same operation, which need not be described. The fingers are raised and dropped at the time of seizing the sheet by a peculiar device, described as follows:

Attached to the finger-bar (Fig. 6) near its end is a projecting piece, *e*, having near its end a wrist-pin or bolt, *f*. On the frame near the edge of the fly-board is a trip-dog, *g*, turning upon a pivot, *h*. This dog is provided with a slot, *i*, into which the wrist-pin enters as the carriage advances, and from the rotation of the dog on its pivot it will be seen that the fingers must rise up until the dog is vertical and then descend as the dog moves on. When the finger bar moves away from the fly-board, the wrist pin carries the dog back to its place for the reception of the pin on its return.

Attached to and near the end of the carriage is the stationary edge or knife *k*, over which the fold is made, (see Fig. 1,) under the folding-board, part of which is represented as broken out to show said knife. The knife is fixed to the frame, the edge rising slightly above its level. The folding-nipper *m* (Figs. 2, 4, and 5) has a pair of grasping edges or jaws, which jaws may be opened and closed in various ways, the mode represented being merely to open the jaws by pressing over the folding edge or knife and keeping them closed by springs. The edge of the knife is slightly raised above the level of the frame on which the paper is carried, so that the paper rests at that part on the edge of the knife. When by the movement of the carriage the knife is brought immediately under the folding-nipper *m*, the carriage stops and the middle margin of the sheet is over the edge of the knife. By mechanism shortly to be described the nipper is brought down upon the knife, the jaws of the nipper pressing the paper over its edge and making the fold. When the nipper moves away from the knife, it carries the folded sheet with it into a position to be folded a second time by the knife *k'* and nipper *m'*. In order to keep the nipper from rising beyond the required position, and to determine or gage this position, I use a check-piece, P, which is adjustable on the graduated stem *s* and a stop-piece, *t*, on the nipper *m*. The check-pin slides toward and from the nipper, being grooved or dovetailed into the piece *u*, which is fixed to the stem *s*. The spring W keeps the check-piece against the nipper *m*. The nipper *m'* is moved by mechanism shortly to be described, and as it comes up to the sheet, which is held in place by the nipper *m*, it folds it over the knife *k'*. At the time the nipper *m'* comes up to make the fold it opens the nipper *m* in the following manner: A projecting piece, *x*, on this nipper strikes the pin *a'*, which is attached to one jaw of nipper *m*, and passes through an opening in the other jaw, so as to open the jaws and release the sheet from the grasp of nipper *m*. The nipper *m* is cut out in the center of the folding-edges to the extent of the width of the bite or grasp of the nipper upon the sheet, so as to allow the second nipper, *m'*, to act upon the whole extent of the sheet. While in the act of folding the nipper *m* is to be carried up till the stop *t* strikes the fixed piece *u* and the nipper *m* is entirely clear from the sheet. The check-piece bears against the stop-piece until the nipper *m* is carried down again to make another fold. The nipper *m'*, having completed the second fold, carries the sheet back to be subjected to a third folding by nipper $m^2$ and knife $k^2$.

The operating, checking, and opening the nipper *m'* and of clearing it from the sheet, are performed in a manner similar to those just described for nipper *m*, and so on for nipper $m^2$, and any number that may be requisite. When the sheet is folded, it is dropped from the last nipper upon the delivery-table *b'*.

The drawings represent a machine for folding octavo volumes. According to the mode of printing, the halves of the sheet must be folded in opposite directions, and the machine is so arranged that one half is folded up and the other half down, the part for folding from below being similar in construction and operation to that already described. The sheet is laid on the fly-board, and as it is taken along by the fingers upon the carriage it is cut in halves by the rolling cutter *c'* upon the straight edge or bed *d'*, and while one half is carried through and folded, as already described, the other goes through a similar course, except that it passes under a knife attached to the fixed block *e'* and is folded by a nipper which rises up from below.

In the machine represented there are two fly-boards, and there are two sets of fingers, *d* $d^2$, upon the reciprocating carriage, and also upon that side of the carriage where the paper is first carried over the knife I have two knives attached to the carriage, which knives *k k*, come alternately under the nipper *m*. A single knife might be placed under the carriage and raised up and carried down at proper times; but the machinery required to effect this would be far more expensive than the two knives moving with the carriage, and otherwise objectionable. When the sheet passes under the knife, one knife, fixed to the frame-work of the machine, will answer to cut the sheets on both sides of the machine. I have two rolling cutters, *c' c²*, at the extremities of a rocking-bar, *f*, which is pivoted to the frame. One end of this bar is in contact with a bifurcated spring-catch or kind of escapement, *g*, and slips over (above and below) a projection in the center of this catch, as it is shown in Fig. 7, by the following means: The extremities of the bed on which the cut is made are provided with inclined planes, one of which is shown at *h'*, Fig. 7, the other being at the opposite part of the carriage. As the cutting-rollers ascend these inclined planes they are alternately raised and depressed, and the end of the rocking-bar is forced to pass over the projection of the escapement, so that it is above the projection when that end of the bar is up and below when it is down. The spiral spring *n'* holds the bar in either of its positions with sufficient force to keep the cutters to their work.

The various motions given to all the folding-nippers are derived from a single cam, A, operating upon the lower ends of the two T-levers T T'. The arms of lever T are furnished with sector-gears B B', which take into arms G G', connected with the rock-shafts D D'. These rock-shafts are inclosed in and pass through hollow rock-shafts E E', with which they are concentric. The arms of the lever T' are also furnished with sector-gears $B^2$ $B^3$, similar to gears B B', and these take into arms $G^2$ $G^3$, connected with the hollow rock-shafts E E'. The first folding-nipper, *m*, gets into motion from rock-shaft D' through the medium of the vibrating arm F, connecting-link G, and lever H, to which the nipper is attached. The second folding nipper, *m'*, gets its motion from the hollow rock-shaft E' through the medium of the vibrating arm F, connecting-link G', sector bevel-gear H', and lever $H^2$. The third nipper, $m^2$, gets its motion from the rock-shaft D' through the medium of arm F, connecting-link $G^2$, and lever $H^3$. The nippers below the carriage get their motion from rock-shafts E D by means similar to those just described for nippers *m m' m²*. The carriage is moved back and forth by the crank K upon the main driving-shaft L through the medium of the connecting-rod M, lever N, and connecting-link P. As the carriage must be stopped while the sheet is folded upon it, the stoppage is caused by the slot R in the connecting-rod M, in which plays the pin connecting the rod with the lever, so that the crank moves through nearly a quarter-revolution while the slot is passing over the pin, and before it acts upon the lever N. The cam A makes two revolutions to one of the crank K, and this is effected as follows: The small gear, R', on the driving-shaft $T^2$ takes into the larger gear, $R^2$, on the cam-shaft $T^3$, and the small gear, $R^3$, on the cam-shaft takes into the larger gear, $R^4$, on the hollow shaft $T^2$, inclosing the driving-shaft. The crank is connected with this hollow shaft, and by the suitable proportionment of the gearing the requisite relative motions are given to cam and rock shafts.

It will now be understood from the description given that the sheet of paper to be folded is first seized by the fingers *d d* of the reciprocating carriages, by which it is conveyed to such a position as that the line at which the first fold is required will come immediately under the first pair of nippers, and also coincide with the stationary knife-edge over which the fold is to be made; that the said nipper then comes into contact with the sheet at the line where the fold is desired and folds the said sheet over the knife-edge, (I mean upon the knife-edge, not that the paper shall necessarily lie on top side of said knife-edge,) and then conveys the so-folded sheet to the desired position for receiving another fold, which is made in a similar manner to the first, (just described;) that this operation of folding is repeated as many times as may be desired, and that the folded sheet is then by the last pair of nippers conveyed to a proper position to be dropped or discharged from the machine.

Having described the construction and operation of the said machine, what I claim as new, and desire to secure by Letters Patent, is—

1. Producing the fold over a stationary knife or straight edge by pressure upon the sheet when in contact with the knife-edge, substantially as described.

2. The use of nippers so constructed as to fold the sheet over the knife-edge, seize it, and carry it to its proper position for receiving another fold, substantially as described.

3. The methods hereinbefore described for releasing the sheet from the nipper.

4. The adjustable check and the mode of releasing its hold by the advance of the nippers, as set forth.

5. Attaching the stationary knives to the reciprocating carriage, as set forth.

6. The combination of the crank K, slotted connecting-rod M, lever N, and link P, substantially as described, for operating the reciprocating carriage.

7. Hanging the cutting-rollers on a bar vibrated and checked as herein described.

8. The arrangement of the T-levers with the double concentric rock-shafts, as hereinbefore described, for operating the nippers from one cam, as set forth.

S. T. BACON.

Witnesses:
J. N. McINTIRE,
JOHN S. HOLLINGSHEAD.